UNITED STATES PATENT OFFICE.

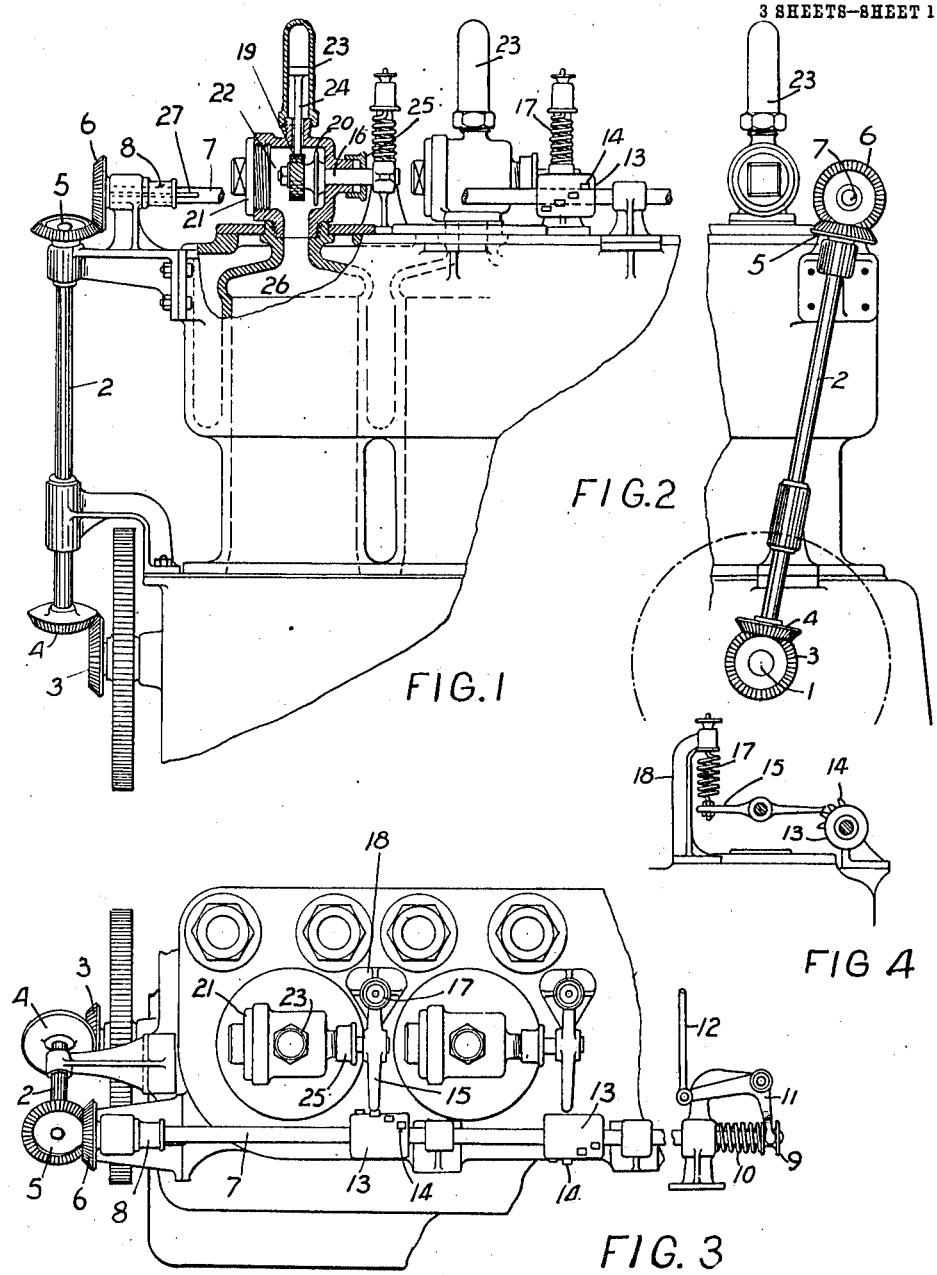

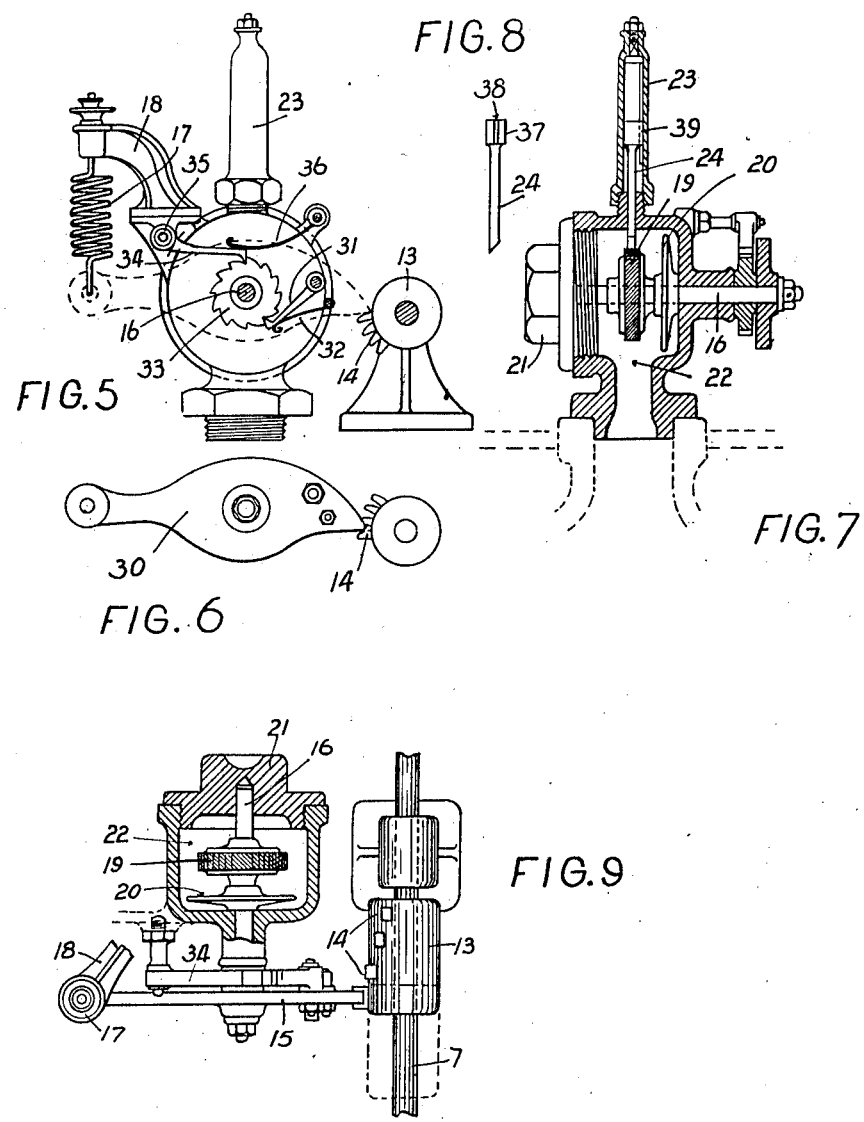

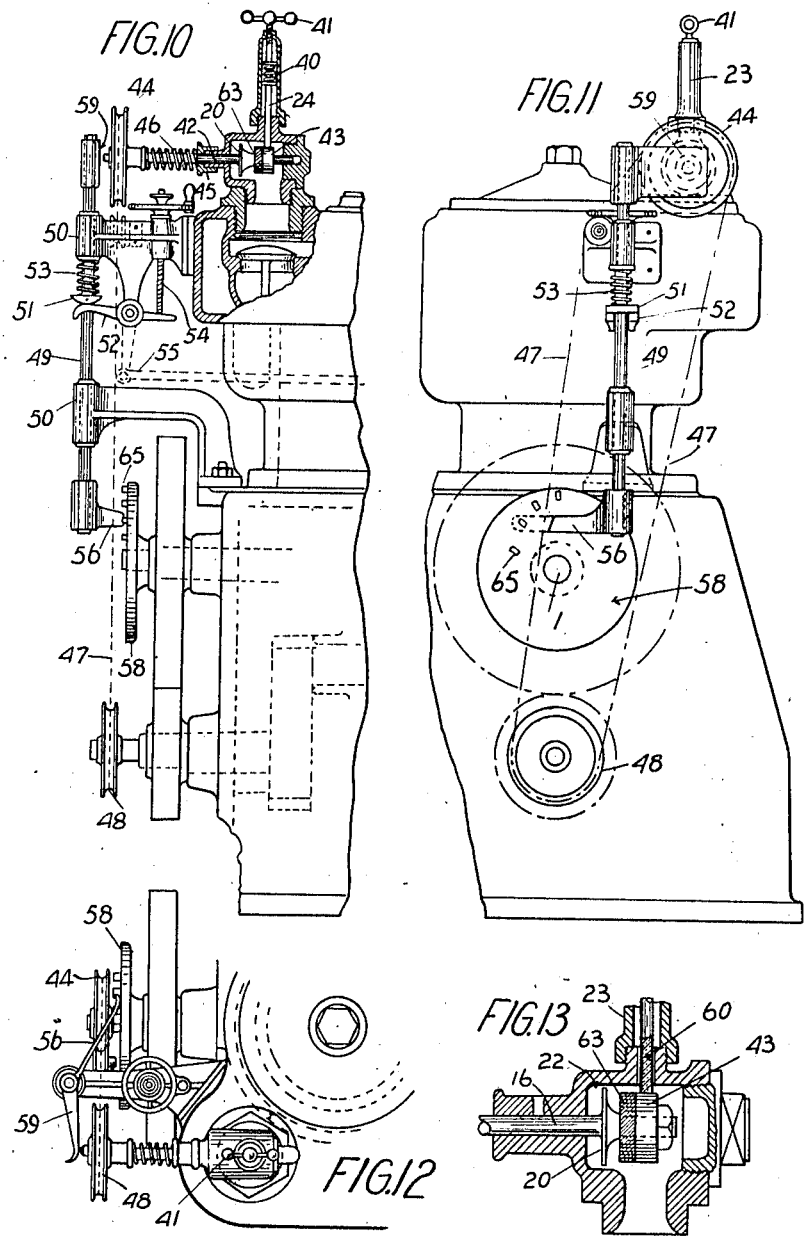

JOHN GLEN NEWMAN, OF MOORE PARK, NEAR SYDNEY, NEW SOUTH WALES, AUSTRALIA.

SPARK IGNITING DEVICE FOR GAS AND OIL ENGINES.

1,055,349. Specification of Letters Patent. Patented Mar. 11, 1913.

Application filed September 20, 1911. Serial No. 650,391.

*To all whom it may concern:*

Be it known that I, JOHN GLEN NEWMAN, a subject of the King of Great Britain and Ireland, residing at 302 Park road, Moore Park, near Sydney, in the State of New South Wales, Australia, have invented certain new and useful Improvements in Spark Igniting Devices for Gas and Oil Engines, of which the following is a specification.

My invention relates to means for igniting the gaseous charge in the cylinders or other explosion chambers of internal combustion engines, and it consists in a mechanical device in the form of a "sparking plug" operated by the engine, by means of which device a "spark" is produced by "striking" with an abradant device a pyrophoric body from which incandescent particles are thrown off when its surface is frictionally excited.

According to my said invention a disk and a pencil, one of which is composed of pyrophoric material and the other of hard metal, are contained in the pocket of a "sparking plug" which pocket is in open communication with the cylinder head or explosion chamber of the engine. The disk is moved at proper intervals by a mechanical connection from the engine shaft. The friction between the disk and the pencil while the same are in rubbing contact the one with the other causes the throwing off of fine particles of the pyrophoric material in an incandescent condition, as "sparks", and the charge is ignited thereby.

The pyrophoric material used is a known metallic composition which when struck or frictionally rubbed by a striker consisting of a scratching or filing rod or disk of steel or other hard metal emits sparks. Abrasive materials such as emery and carborundum possess pyrophoric properties, but are objectionable for this use as their dust is liable to cause mechanical injury to the piston rings and cylinder walls and other parts of engines. I therefore prefer to use known pyrophoric metallic substances composed of iron, carbon and cerium or like elements, the dust of which is not an active abradant.

In the accompanying drawings an ignition device according to the invention is illustrated with certain alternative variations in detail in the mechanical devices used for imparting motion to the moving element.

Figure 1 is a fragment sectional elevation of an engine with sparking devices according to my invention fitted to the cylinder heads and fitted with mechanism for oscillating the disks in proper timing with the engine shaft rotations; Fig. 2 fragment end view of the shaft and bevel wheel connection from the half time or cam shaft; Fig. 3 corresponding top plan; Fig. 4 detail elevation of the spring and cam mechanism by which the disk spindle is oscillated; Fig. 5 is a side elevation showing the mechanical operating device arranged to move the disk a part of a rotation at the correct intervals instead of oscillating the disk a part of a rotation as in the arrangement shown in Figs. 1 to 4; Fig. 6 detail of the tappet arm and cam drum; Fig. 7 vertical sectional elevation; Fig. 8 detail of pencil; and Fig. 9 plan-horizontal section corresponding with Figs. 5 and 7; Fig. 10 is a vertical sectional elevation illustrating an arrangement in which the disk is maintained in permanent rotation, and is slid endwise into contact with the pencil at the correct sparking times; Fig. 11 is a corresponding end elevation; Fig. 12 a corresponding fragment top plan; and Fig. 13 an enlarged (about full size) vertical section through the "plug" or sparking device.

It is immaterial whether the pencil or the disk be composed of the pyrophoric material, but in practice it is preferred that the pencil shall be made of pyrophoric material and that the disk shall be of hard steel with a serrated striking edge. The best striking edge is obtained with a polished disk of steel having a few fine clean marks cut across it, such as would be made on a surface of soft metal by scoring it with a penknife. The contact of one such "serration" with the pyrophoric pencil is fully sufficient to produce a fat spark if the movement of the disk be rapid. If the disk be made of pyrophoric material, the pencil is made of hard steel rod with a sharpened or chisel point. Very light pressure only is required at the point of contact between disk and pencil to enable the production of a satisfactory spark; in practice the pencil is made to bear only with its own weight against the periphery of th disk, but to provide against looseness of the contact due to engine vibration a very light spring with or without a screw down pressure device to take up wear of the pencil may be set to bear the pencil against the disk.

Referring to Figs. 1 to 4: 1 is the half time shaft, 2 connecting shaft geared thereto by bevel wheels 3 and 4, 5 and 6 are bevel wheels transferring the drive from the shaft 2 to the way shaft 7 through the collar 8 which is made with an internal slot engaging the way shaft 7 by means of a feather 27 thereon. The rear end of the way shaft 7 is fitted with a grooved collar 9 against which bears a helical spring 10 in compression, 11 is a bell crank with forked end engaging the grooved collar 9 and operated from a hand lever or from a governor of any known type through a link connection 12. 13 are cam drums keyed on the way shaft 7. These drums are each armed with a series of detents or cams 14 arranged in helical order, en echelon. 15 are tappet arms keyed to the oscillating disk spindles 16 and hung up at the rear ends by helical spring 17 to brackets 18. 19 are the striker disks, 20 oil fan disks, 21 inspection plugs, 22 pockets in the "sparking plug" in which the disks and pencils are contained, 23 tubular cap containing the striking pencil 24, 25 stuffing box, 26 engine cylinder.

Referring to Figs. 5 to 9: In this arrangement the disk is made to turn a portion of a rotation at each contact of the cam with the tappet instead of being made to oscillate to and fro on its axis as in the arrangement shown in Figs. 1 to 4. Corresponding figures of reference indicate parts similar to those shown in Figs. 1 to 4. The tappet 30 carries a pawl 31 and a spring 32 which bears said pawl 31 against the detent wheel 33 which is keyed to the disk shaft 16. A pawl 34 centered on the bracket 18 at 35 also engages the detent wheel 33 and is kept in engagement therewith by means of a spring 36. In Fig. 8 the disk is of pyrophoric material and the steel pencil 24 is shown formed with a head 37 having a slot 38 cut lengthwise in it. A feather 39 in the cap 23 fits loosely in the slot 38 and so prevents rotation of the steel pencil while permitting it to drop freely by reason of its weight so that its chisel point keeps in contact with the pyrophoric disk 19. Obviously the pencil may be made of pyrophoric material and the disk of hard metal with a serrated edge. In that case the pencil is not fitted with a slot and feather 38, 39.

Referring to Figs. 10 to 13,—an arrangement is shown in which the disk 63 is of pyrophoric material and the pencil 24 a hard steel rod preferably with sharpened chisel point. The pencil is shown under pressure of a light spring 40, the tension of which may be regulated by means of a hand screw 41. Such a spring and regulator is usable also in the constructions shown in the preceding figures. Upon the striker spindle 42 there is set beside the striker disk 63 a smooth edge disk of steel or bronze 43. The spindle 42 is rotatable in the pocket 22, and as in the previous arrangements a fan disk 20 is fitted between its main bearing and the pyrophoric disk. The outer end of the spindle 42 is fitted with a belt wheel 44 between which and the end of the stuffing box 45 is a helical spring 46 in compression. The spindle 42 is rotatable and also movable endwise in its bearings and is normally held outward by means of the spring 46 so that the pencil 24 will ride on the hard smooth edged disk 43. A belt, indicated by the dotted line 47, conveys rotation to the wheel 44 and thence to the shaft 42 from the wheel 48 which is mounted on the end of the crank shaft or on any other suitable rotating part of the engine. 49 is a vertical rocker shaft slidable endwise in its bearings 50 and supported by riders 51 which sit on the forked ends of a rocking lever 52. Between the riders 51 and the upper bearing 50 is a helical spring 53 in compression. An adjusting screw 54 is fitted for setting the limit of vertical position of the rock shaft 49. This position of the rock shaft can be however varied by moving the lever 52 on its axis by means of the link and lever gear 55 shown in dotted lines in the drawings, which gear is operated either manually or by any governor. Normally the spring 53 will press the rock shaft 49 downward as far as it will be permitted to go by the set of the lever 52. The lower end of the rock shaft 49 is fitted with a tappet arm 56 which is engageable by any one of a series of cams 65 mounted on the disk 58, which disk is keyed on the end of the half time shaft 1. The upper end of the rock shaft 49 has also keyed upon it a wing or pusher plate 59 which makes contact with the outer end of the striker disk spindle 42 without checking its rotational movement. The pyrophoric pencil as shown in Fig. 13 is incased in a brass shell 60 which facilitates its sliding in the tubular cap 23 and through the aperture in the top of the pocket 22.

The operation is as follows:—Referring to Figs. 1 to 4, the way shaft 7 is in permanent rotation at the same rate of speed as the half time shaft 1. As the cam drums rotate with it, and as one or other of the cams on each of these drums is in alinement with one of the tappet levers 15, those tappet levers are each actuated once in every two revolutions of the engine and each in its proper firing order and firing interval. At each oscillation these tappet levers oscillate the striker spindle and the striker thereon, causing the edge of the striker disk to make frictional contact with the end of the pencil, whereby a spark is produced. The longitudinal position of the way shaft 7 having been set by means of the bell crank lever 11 so as to bring into alinement with the tappet levers 30 that series of the cams 14 and the cam drums 13 which correspond to the required timing of ignition. The oil fan disk 20 throws off any oil which may leak inward from the spindle bearing. The presence of oil on the pyrophoric material tends to diminish its sparking quality and it is therefore desirable that means be used for the purpose of keeping the pyrophoric material dry.

Referring to Figs. 5 to 9: The tappet levers 30 are reciprocated once in every rotation of the way shaft 7 by the contact of said cams 14 against the ends thereof, and the reactive movement applied by the spring 17 when the levers are released by said cams 14. In the lifting movement effected directly by contact of the cams, the pawls 31 are advanced over one of the teeth in the detent wheel 33. The return movement of the tappet lever 30 effectuated by the pull of the spring 17 is applied to the detent wheel 33 through the pawl 31 which is held up to its work by the back spring 32; and the detent wheel 33 and consequently the spindle 16 are thus partially rotated. At each said partial rotation the detent wheel 33 is locked by the fixed spring pawl 34 in order that in the lifting movement of the tappet the spindle 16 and the striker disk will not be reversely rotated. At each such partial rotation of the striker disk 19, its edge is rubbed against the point of the striker pencil 24 and a stream of sparks is projected into the pocket 22 and the gas charge is lighted by the sparks. There may be any required number of cams 14 on the cam drums 13 in order to provide for any necessary gradation in the timing of ignition and for any necessary extreme limit of such timing. In order to change the timing of ignition it is only necessary, as in the case of Figs. 1 to 4, to slide the way shaft 7 in its bearings by means of the link and lever gear 11—12, which is best shown in Fig. 3.

Referring to Figs. 10 to 13: The pencil is composed of pyrophoric material. The spindle 42 carrying the plain disk 43 and the striker disk 63 as also the oil fan disk 20 is slidable in its bearings in the "sparking plug" but it is held outward by the spring 46 so that the smooth disk 43 is in contact with the pencil end. The shaft 42 and the disks are kept in constant rotation by means of the belt 47 passing over the wheels 48 and 44, but the striker disk is only brought in contact with the striker pencil when the spindle 42 is slid inward by the pressure of the pusher plate 59 upon its end. This contact of the pusher plate occurs when the vertical shaft 49 is rocked in its bearings and such rocking is effected by the contact with its tappet 56 of one or other of the cams 65 on the face of the wheel 58, said wheel being rotated by the half time shaft. The cams 65 are arranged in spiral order on the face of the disk 58. The particular cam by which the tappet 56 will be operated depends upon the vertical position of the rock shaft 49, and this vertical position is controlled by means of the link and lever gear 52—55, the limit being set by means of the regulating screw 54. During the rotation of the engine, therefore, the shaft 49 is oscillated by contact of the cams 65 with its tappet 56 once in every alternate revolution, and this oscillation of the shaft 49 causes the pusher plate 59 to press the spindle 42 inward, thereby bringing the striker disk 63 under and in contact with the striker pencil. As the disk 63 is permanently in rotation, immediately it is brought in contact with the pencil 24 a stream of sparks is emitted.

As shown in Fig. 13 the striker disk 63 is formed with a file surface and in other figures with a milled surface. It is however, only necessary that the disk be lightly marked as before described, as very light frictional contact with the end of a pyrophoric pencil suffices to produce the necessary spark stream.

The spiral or helical arrangement of the series of cams, which is the same on each of the several drums, and the means described for bringing said drums into operative relation with the lever tappets, enables the spark to be produced in every cylinder at the proper position of "retard" or "advance" to obtain satisfactory ignition of the several combustible charges.

What I claim as my invention and desire to secure by Letters Patent is:—

1. An ignition device for combustion engines which consists of a rotatable disk and a pencil in frictional contact therewith, one of the two being made of pyrophoric material, and means for intermittently rotating said disk to form a spark to ignite the charge in the engine.

2. An ignition device for combustion engines which consists of a rotatable disk and a pencil in frictional contact therewith, one of the two being made of pyrophoric material, and means for intermittently rotating said disk to form a spark to ignite the charge in the engine, said means responsive to the rotation of the engine crank shaft.

3. An ignition device for combustion engines which consists of a rotatable disk and a pencil in frictional contact therewith, one of the two being made of pyrophoric material, and means for intermittently rotating said disk to form a spark to ignite the charge in the engine, and means for varying the time when said rotation takes place with respect to the position of the engine parts.

4. An ignition device for combustion engines which consists of a rotatable disk and a pencil in frictional contact therewith, one of the two being made of pyrophoric material, and means for intermittently rotating said disk to form a spark to ignite the charge in the engine, said means responsive to the rotation of the engine crank shaft and means for varying the time when said rotation takes place with respect to the position of the engine parts.

5. An ignition device for combustion engines which consists of a rotatable disk and a pencil in frictional contact therewith, one of the two being made of pyrophoric material, and means for intermittently rotating said disk comprising a rotating shaft driven from the crank shaft, a cam lever in connection with said rotatable disk and cam tappets on said shaft, to form a spark to ignite the charge in the engine.

6. An ignition device for combustion engines which consists of a rotatable disk and a pencil in frictional contact therewith, one of the two being made of pyrophoric material, and means for intermittently rotating said disk comprising a rotating shaft driven from the crank shaft, a cam lever in connection with said rotatable disk and cam tappets on said shaft to form a spark to ignite the charge in the engine, said means responsive to the rotation of the engine crank shaft.

7. An ignition device for combustion engines which consists of a rotatable disk and a pencil in frictional contact therewith, one of the two being made of pyrophoric material, and means for intermittently rotating said disk comprising a rotating shaft driven from the crank shaft, a cam lever in connection with said rotatable disk and cam tappets on said shaft to form a spark to ignite the charge in the engine, said cam tappets being arranged spirally around the axis of the shaft and means for longitudinally displacing said shaft to bring different tappets in opposition to the lever.

8. An ignition device for combustion engines which consists of a rotatable disk and a pencil in frictional contact therewith, one of the two being made of pyrophoric material, and means for intermittently rotating said disk comprising a rotating shaft driven from the crank shaft, a cam lever in connection with said rotatable disk and cam tappets on said shaft to form a spark to ignite the charge in the engine, said means responsive to the rotation of the engine crank shaft, said cam tappets being arranged spirally around the axis of the shaft and means for longitudinally displacing said shaft to bring different tappets in opposition to the lever.

9. The combination with an internal combustion engine of a chamber in communication with the cylinder, a disk rotatably mounted in said chamber, a pencil slidably mounted in said chamber and engaging at its end said disk, a shaft upon which said disk is pivotally mounted, a rocker arm carried by said shaft, yielding means for holding said rocker arm in position and a driving device interposed between said rocker arm and the engine crank shaft for operating said rocker arm against said yielding means to rotate the disk, said disk being made of pyrophoric material.

10. The combination with an internal combustion engine of a chamber in communication with the cylinder, a disk rotatably mounted in said chamber, a pencil slidably mounted in said chamber and engaging at its end said disk, a shaft upon which said disk is pivotally mounted, a rocker arm carried by said shaft, yielding means for holding said rocker arm in position and a driving device interposed between said rocker arm and the engine crank shaft for operating said rocker arm against said yielding means to rotate the disk, said disk being made of pyrophoric material, and means for varying the time of rotation of said disk with respect to the timing of the engine parts.

11. The combination with a combustion engine of a rotating disk, of pyrophoric material, a pencil contacting it and means for rotating said disk to form a spark, said rotating means comprising a shaft driven by the engine, a cylinder upon said shaft, a rocker arm in connection with said disk, and cam tappets on said cylinder in opposition to said rocker arm to rotate the disk.

12. The combination with combustion engines of a rotating disk of pyrophoric material, a pencil contacting it and means for rotating said disk to form a spark, said rotating means comprising a shaft driven by the engine, a cylinder upon said shaft, a rocker arm in connection with said disk, and cam tappets on said cylinder in opposition to said rocker arm to rotate the disk, and means for simultaneously displacing said cylinder to bring different cam tappets into opposition with the rocker arm, said cam tappets being arranged at different points about the axis of rotation of the shaft.

13. The combination with a combustion motor of a disk rotating in response to the rotation of the drive shaft, a pencil in contact therewith, a portion of said disk being of pyrophoric material, the remainder not; and means responsive to the position of the engine parts for bringing the pyrophoric portion of the disk intermittently into engagement with the pencil.

14. The combination with a combustion motor of a disk rotating in response to the rotation of the drive shaft, a pencil in contact therewith, a portion of said disk being of pyrophoric material, the remainder not, and means responsive to the position of the engine parts for bringing the pyrophoric portion of the disk intermittently into engagement with the pencil, said means comprising a cam and cam arm and a connection from said cam arm to said disk.

15. The combination with a combustion motor of a disk rotating in response to the rotation of the drive shaft, a pencil in contact therewith, a portion of said disk being of pyrophoric material, the remainder not, and means responsive to the position of the engine parts for bringing the pyrophoric portion of the disk intermittently into engagement with the pencil, said means comprising a cam and cam arm and a connection from said cam arm to said disk, said connection being adapted to slide said disk back and forth so as to alternately bring the pyrophoric and non-pyrophoric portions of the disk into engagement with the pencil.

In testimony whereof I have affixed my signature in presence of two witnesses.

JOHN GLEN NEWMAN.

Witnesses:
N. J. CANDRICK,
W. J. DAVIS.

Copies of this patent may be obtained for five cents each, by addressing the "Commissioner of Patents, Washington, D. C."